No. 762,579. PATENTED JUNE 14, 1904.
W. N. DUFFORD.
VEGETABLE SLICER.
APPLICATION FILED MAY 22, 1903.
NO MODEL.
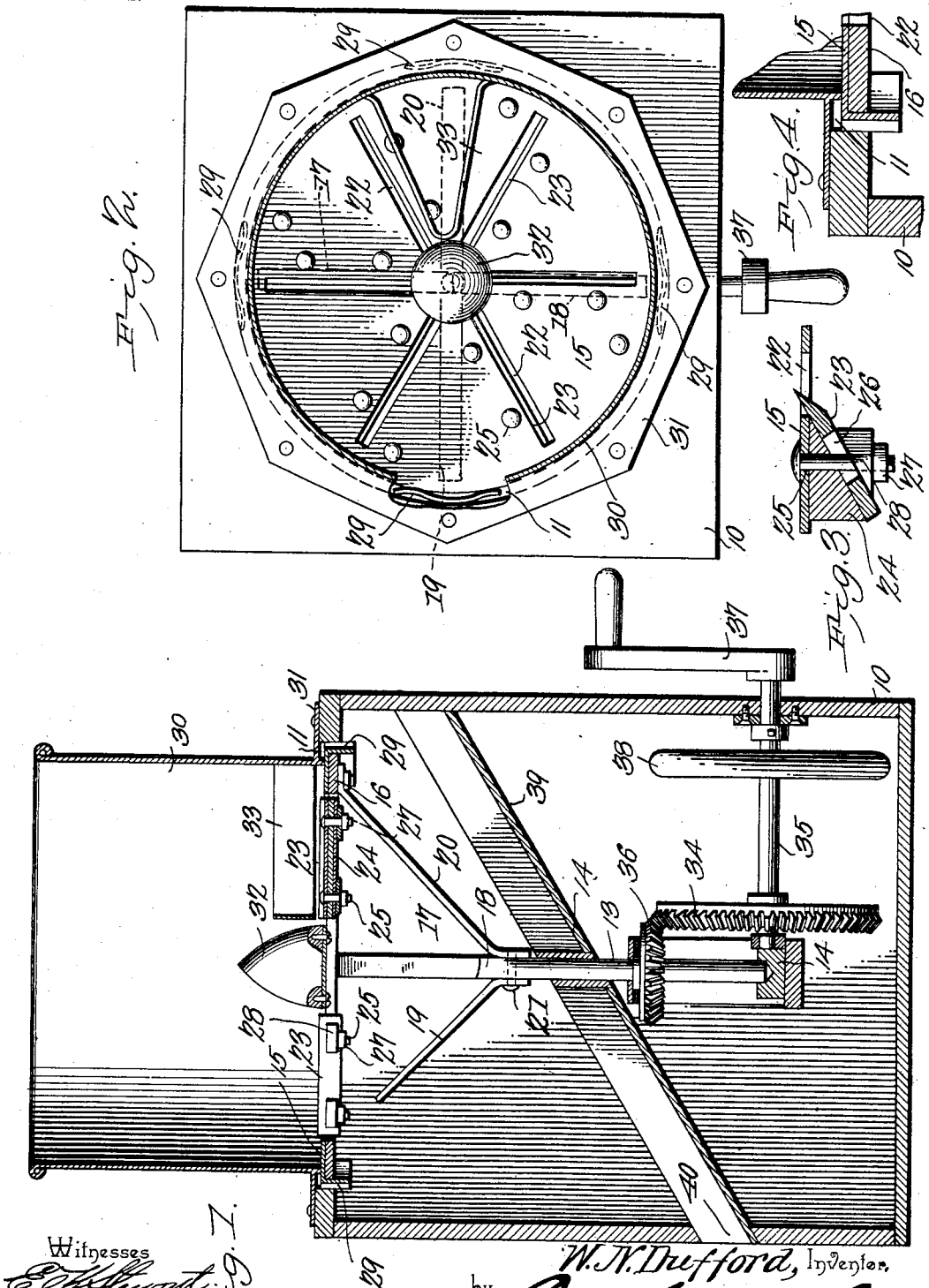
Witnesses
W. N. Dufford, Inventor.
Attorneys No. 762,579. Patented June 14, 1904.

UNITED STATES PATENT OFFICE.

WILLIAM NELSON DUFFORD, OF FINDLAY, OHIO.

VEGETABLE-SLICER.

SPECIFICATION forming part of Letters Patent No. 762,579, dated June 14, 1904.

Application filed May 22, 1903. Serial No. 158,353. (No model.)

*To all whom it may concern:*

Be it known that I, WILLIAM NELSON DUFFORD, a citizen of the United States, residing at Findlay, in the county of Hancock and State of Ohio, have invented a new and useful Vegetable-Slicer, of which the following is a specification.

This invention relates to devices for slicing vegetables and similar products of various kinds, and has for its object to produce a device of this character simple in construction, easily operated, and which may be adapted for all the various uses for which such devices are generally employed.

The invention consists in certain novel features of construction, as hereinafter shown and described, and specified in the claims.

In the drawings illustrative of the invention, in which corresponding parts are donated by like designating characters, Figure 1 is a sectional side elevation. Fig. 2 is a plan view. Fig. 3 is a sectional detail view taken transversely through one of the cutters and the disk. Fig. 4 is a sectional detail view taken through the upper edge of the supporting-casing, the lower part of the hopper, and the edge of the cutting-disk.

The improved device is designed for domestic use more particularly, but may be employed in hotels, large boarding-houses, canneries, and in similar localities where vegetables are to be sliced, and I do not therefore desire to be limited in any manner as to purposes for which or the localities where it may be employed; but for the purpose of illustration the device is shown as a domestic slicer, 10 representing a base or support having a circular aperture 11 in the upper side and with a main drive-shaft 13 mounted for rotation in bearings 14 beneath the aperture, as shown.

Within the aperture 11 is disposed a disk 15, of relatively thin sheet-steel and supported peripherally by an annular ring-frame 16, the ring-frame and disk nearly filling the aperture 11, as shown.

Branching from the upper end of the shaft 13 are two diverging arms 17 18, integral with the shaft and with their outer or free ends connected to the ring-frame 16, as shown.

The shaft 13 is further connected to the ring-frame by brace members 19 20, disposed intermediately of the brace members 17 18 and connected at their lower ends by a transverse bolt 21 just above the "crotch" of the members 17 18 and at their upper ends to the ring-frame intermediately of the brace members 19 20, as shown. By this simple means the disk 15 and ring-frame 16 are firmly supported from the shaft and concentrically thereto and partaking of its motion without internal obstruction to the disk.

The disk 15 is provided with a plurality of radially-disposed apertures 22, and supported beneath the disk, at an angle to the plane thereof, are cutting-knives 23, one for each aperture and with their cutting edges protruding through the apertures and projecting above the upper surface of the disk, as shown.

Between each of the knives and the under surface of the disk is an inclined spacing-block 24, serving as a means whereby the knives may be maintained in their inclined position.

The knives will be secured to the disk by spaced bolts 25, and the apertures for the bolts through the knives will be elongated transversely thereof, as at 26, so that the knives may be adjusted to regulate the extent of the protuberance through the apertures in the disks, as will be obvious. The nuts 27 of the bolts 25 will be provided with inclined washers 28, as shown, so that the nuts will bear with their full force. By this simple means the knives will be firmly supported and rotate with the disk and may be adjusted as required.

The thickness of the slices is regulated by the vertical adjustment of the knives above the plane of the disk.

Between the periphery of the annular frame 16 and the inner edge of the aperture 11 are arranged a series of spaced springs 29, exerting their force to maintain the disk and its frame yieldably in position and prevent lateral movement or "play" thereto. These springs, which are ordinary bow-springs, may be suitably mounted and secured upon the inner edge of the aperture 11, with their ends bearing against the edge of the reinforcing-ring 16 of the cutter-disk, thereby sustaining the latter yieldably in position and furnishing but few points of contact, thereby facilitating the operation of the device.

Extending above the frame or casing 10 is a receptacle 30, preferably cylindrical and supported by an annular bracket 31, resting upon the upper side of the casing 10, the lower edge or rim of said receptacle being in close proximity to the upper face of the disk 15, as shown in Fig. 1.

A cone 32 rises centrally of the disk 15, with the inner ends of the apertures 22 terminating at the periphery of the cone to prevent the material settling upon the central portion of disk and remaining out of the influence of the cutting-blades.

Extending inwardly from the wall of the receiver 30 is a guard 33, serving as a stop to engage the material and prevent its being carried around by the rotating disk and knives. The cone 32 and guard 33 thus coact to maintain the material to be sliced in constant engagement with the rotating knives and preventing it from rotating with the knives or settling in the central portion out of the influence of the knives. The cone 32 and guard 33 are therefore very important features of the invention and add materially to value and efficiency of the device.

Any suitable means may be employed to rotate the shaft 13, such as a gear 34 upon a counter-shaft 35, operating upon a pinion 36 on the shaft 13, as shown, the shaft 35 having an operating-crank 37 and preferably provided with a fly-wheel 38 to increase the momentum and render the action easier.

Suitably secured within the casing 10 is an inclined partition 29, forming a chute which communicates at its lower end with an opening 40 in the side of the casing. This partition in addition to acting as a chute to convey the sliced material to the outside casing also forms a partition within the latter between the gearing or operating mechanism below and the cutting mechanism above. Furthermore, this partition serves to support the upper bearing 14 for the shaft 13, which extends through said partition, as will be clearly seen in Fig. 1 of the drawings.

The device may be adapted for slicing any of the various vegetables employed for culinary purposes or preparing them in any manner for food and may be of any size or capacity and of any suitable material or combination of materials.

The plate 15, annular frame 16, and inclined knife-supporting blocks 24 may be cast in one piece, and the divider 32 may likewise be cast integral with the disk, if preferred; but this would not be a departure from the principle of the invention.

Having thus described the invention, what I claim is—

1. In a device of the class described, a casing having a circular aperture at its upper end, a cutter-disk in said aperture having an annular reinforcing-ring on its under side, a vertical shaft supported within the casing and supporting said cutter-disk, means for revolving said shaft, and bow-springs secured to the inner edge of the aperture and bearing against the edge of the disk.

2. In a device of the class described, a casing having a circular aperture in its upper side, a shaft mounted vertically within the casing, an inclined partition within said casing forming a discharge-chute, a bearing for the shaft extending through said partition, means disposed below said partition for rotating the shaft, a cutter-disk mounted upon the upper end of the shaft and braced to the latter, and bow-springs interposed at various equidistant points between the cutter-disk and the inner edge of the circular opening and forming points of contact and support for the disk.

In testimony that I claim the foregoing as my own I have hereto affixed my signature in the presence of two witnesses.

WILLIAM NELSON DUFFORD.

Witnesses:
J. M. PLATT,
WM. T. PLATT.